United States Patent Office 2,706,206
Patented Apr. 12, 1955

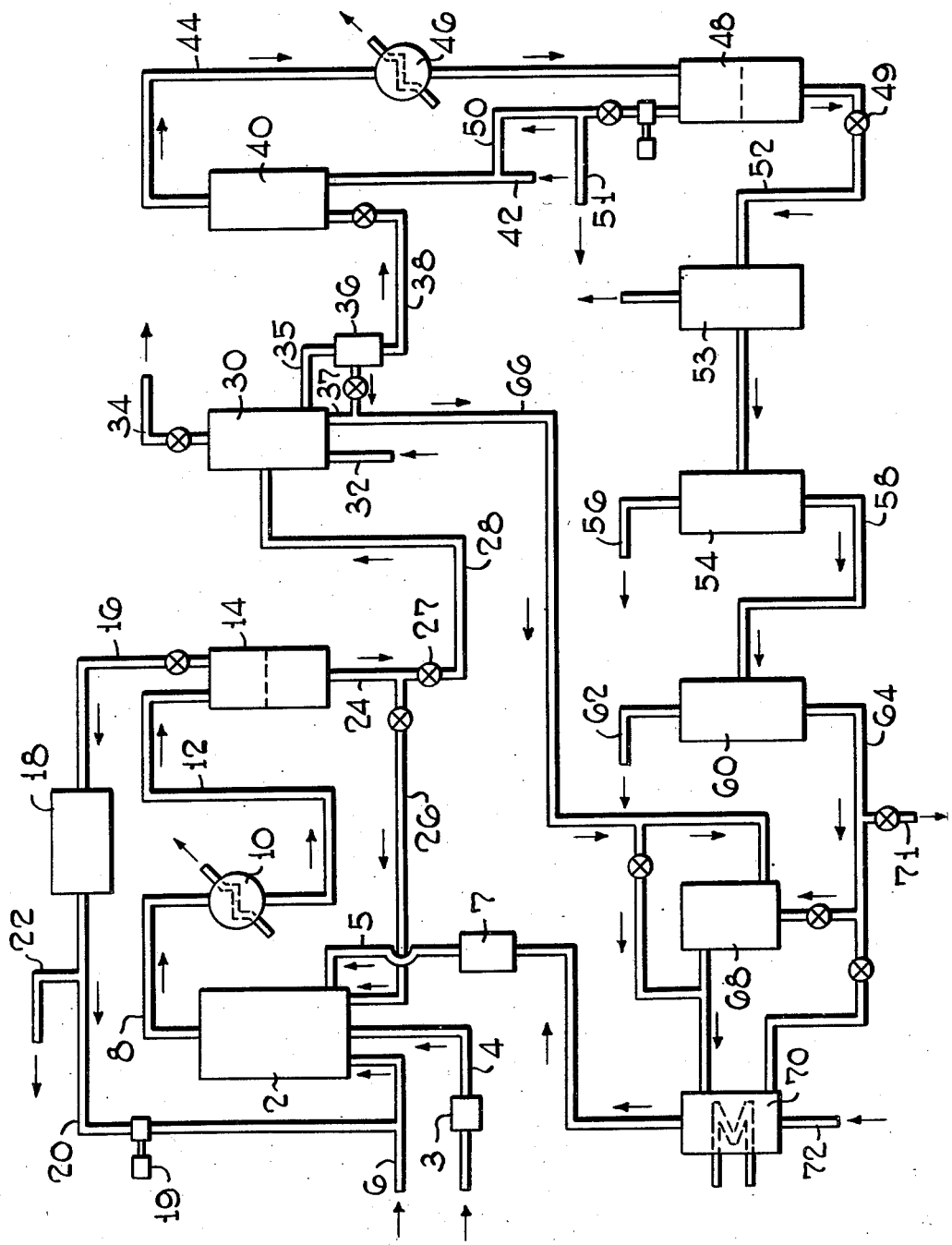

2,706,206

DISPERSION OF SOLID COBALT CATALYST IN ORGANIC LIQUID

John J. Owen and Fred J. Bachmann, Baton Rouge, La., assignors to Esso Research and Engineering Company, a corporation of Delaware Application January 5, 1951, Serial No. 204,636

11 Claims. (Cl. 260—604)

The present invention relates to the preparation of oxygenated organic compounds by the reaction of carbon monoxide and hydrogen with carbon compounds containing olefinic linkages in the presence of a carbonylation catalyst. More specifically, this invention relates to an improved process for utilizing solid catalyst such as spent catalyst in the reaction.

It is now well known in the art that oxygenated organic compounds may be synthesized from organic compounds containing olefinic linkages by a reaction with carbon monoxide and hydrogen in the presence of a catalyst containing metals of the iron group, such as cobalt or iron, preferably the former, in an essentially three-stage process. In the first stage, the olefinic material, catalyst and the proper proportion of CO and $H_2$ are reacted to give a product consisting predominantly of aldehydes containing one more carbon atom than the reacted olefin. This oxygenated organic mixture, which contains dissolved in it salts and the carbonyls and molecular complexes of the metal catalyst, is treated in a second stage to cause removal of soluble metal compounds from the organic material in a catalyst removal zone. The catalyst-free material is then generally hydrogenated to the corresponding alcohols, or may be oxidized to the corresponding acids.

This carbonylation reaction provides a particularly attractive method for preparing valuable primary alcohols which find large markets, particularly as intermediates for plasticizers, detergents and solvents. Amenable to the reaction are long and short chained olefinic compounds, depending upon the type alcohols desired. Not only olefins, but most organic compounds possessing at least one non-aromatic carbon-carbon double bond may be reacted by this method. Thus, straight and branch chained olefins and diolefins such as propylene, butylene, pentene, hexene, butadiene, pentadiene, styrene, olefin polymers such as di- and tri-isobutylene and hexene and heptene dimers, polypropylene, olefinic fractions from the hydrocarbon synthesis process, thermal or catalytic cracking operations, and other sources of hydrocarbon fractions containing olefins may be used as starting material, depending upon the nature of the final product desired.

The catalysts in the first stage of the process may be added in the form of salts of the catalytically active metal with high molecular fatty acids, such as stearic, oleic, palmitic, naphthenic, etc., acids. Thus, suitable catalysts are, for example, cobalt oleate or naphthenate or iron linoleate. These salts are soluble in the liquid olefin feed or in liquid products from the reaction and may be supplied to the first stage as hydrocarbon solution or dissolved in the olefin feed or in a stream of recycled product. Also, it has been proposed to employ catalyst deposited on a carrier, preferably activated with thoria, in the form of a slurry and employ the supported cobalt metal in the slurry directly rather than the metal soap.

The synthesis gas mixture fed to the first stage may consist of any ratio of $H_2$ to CO, but preferably these gases are present in about equal volumes. The conditions for reacting olefins with $H_2$ and CO vary somewhat in accordance with the nature of the olefin feed, but the reaction is generally conducted at pressures in the range of about 1500 to 4500 p. s. i. g. and at temperatures in the range of about 150°–450° F. The ratio of synthesis gas to olefin feed may vary widely; in general, about 2500 to 15,000 cubic feet of $H_2$+CO per barrel of olefin feed are employed.

At the end of the first stage, when the desired conversion of olefins to oxygenated compounds has been effected, the product and the unreacted material are generally withdrawn to a catalyst removal zone, where dissolved catalyst is removed from the mixture, and it is to this stage that the present invention applies.

One of the major problems involved in adapting the aldehyde synthesis process to commercial scale operation is the problem of the catalyst balance. The catalyst such as cobalt, irrespective as to the form in which it is added in the synthesis stage, is appreciably converted to a soluble form, principally the carbonyl and this carbonyl as well as any dissolved or suspended solids, must be removed before the final hydrogenation stage, because otherwise it would tend to decompose in and plug up the equipment in the hydrogenation system and also inactivate the hydrogenation catalyst. Thus, prior to the hydrogenation system, the cobalt carbonyl is decomposed, for example, by heating at relatively low pressures and temperatures in the presence of a stripping gas in a catalyst decomposition zone, called a decobalter, and the finely-divided metal along with minor quantities of iron, is removed in the form of a settled sludge or filter cake. This material contains the major portion of the cobalt catalyst fed to the process, and it is of course, highly desirable to recover this metal and return it to the primary synthesis reactor by the simplest and cheapest method possible and in a manner consistent with acceptable catalytic activity and freedom from maintenance difficulties with the equipment. The economic feasibility of the whole alcohol synthesis process may depend in large measure upon this catalyst recovery, particularly where light olefins are being reacted.

There have been several proposals in the past for utilization of the cobalt precipitated in the decomposition zone by heat and hydrogen. One such is the extraction of the precipitated metal with mineral acid, conversion of the mineral acid salt into organic cobalt salt, and reuse of the latter in the synthesis stages, a relatively costly and uneconomic procedure. Another proposal has been to reconvert the precipitated cobalt metal with carbon monoxide back to cobalt carbonyl, which then can be dissolved in olefin or alcohol and used as cobalt concentrate in the reactor feed. Among other disadvantages is the fact that for this purpose practically pure CO is required, to prevent formation of undesired hydrocarbon synthesis products. Another disadvantage is the fact that large high pressure vessels are required for carbonyl formation. On a commercial basis, these are definitely uneconomic factors.

In the past, the two most promising means of adding catalyst to the carbonylation zone have been, as pointed out above, the addition of the cobalt as a fatty acid salt soluble in the olefin hydrocarbon feed and the addition of supported cobalt metal as a slurry. Though the addition of the olefin-soluble cobalt salt or soap has given excellent results in terms of yields, it is not entirely satisfactory, for not only are the cobalt soaps expensive, in that they must be prepared from commercially available inorganic cobalt material, but also, as a result of the reaction, the acid corresponding to the soap is liberated, and this contaminates the reaction product, not only with fatty acids, but with esters resulting from interaction of the liberated acids with product alcohol. On the other hand, the use of cheap sources of cobalt, such as the metal, oxide, carbonate, etc., is also encompassed about with difficulties. Slurry operation is undesirable, because of erosion problems of equipment necessary to pump slurries at the high pressure of the reaction. Also, it has been found that the reaction rates of these slurry catalysts are substantially slower than those of the dissolved catalyst, because, inter alia, the reaction is carried out in the liquid phase.

Another problem that is found in the aldehyde synthesis reaction is that because of the extremely high heat of reaction, of the order of 35–50 Kcal./mol, there is a pronounced tendency to the formation of secondary reaction products. Thus aldehydes are to some extent, hydrogenated, even in the first stage, to alcohols, which in turn, react further with aldehydes to form acetals and water. Also, reactions of the Cannizzaro type occur, forming acids and alcohols which may then esterify to esters and water. Decomposition of fatty acid cobalt soaps resulting from the conversion of the cobalt to cobalt hydrocarbonyl, the active catalyst, also causes ester formation. These side reactions are undesirable, inasmuch as they markedly decrease product yields and make separation of ultimate products considerably more difficult.

It is, therefore, the principal object of the present invention to provide an improved means for employing cheap solid cobalt catalysts in a continuous synthesis reaction wherein alcohols are produced from olefins.

It is also an object of the present invention to disclose an improved process for employing spent cobalt carbonylation catalyst in the above process.

A still further object of the present invention is to combine such operations in a manner whereby side reactions within the carbonylation reactor are minimized and yields improved.

Other objects and advantages of the invention will become apparent from the more detailed description hereinafter.

It has now been found that olefin insoluble cobalt material such as the cobalt metal cake formed as a result of the decomposition of cobalt carbonyl in the decobalter, and also cobalt oxide, cobalt carbonate, cobalt hydroxide, etc., after suitable dispersion, but without conversion into other cobalt compounds, may be employed per se in the catalytic formation of aldehydes and alcohols when it is introduced into the reactor suspended in an emulsion of an immiscible organic liquid and water. The organic liquid may be the olefin feed, bottoms from product distillations, crude aldehyde, or alcohol product, all of which streams being available in the alcohol synthesis plant and thus not introducing contaminants. It has been found that the emulsified material is an excellent catalyst for the aldehyde synthesis reaction and reacts readily with CO and $H_2$, forming the active species of the catalyst, probably cobalt hydrocarbonyl.

In accordance with one embodiment of the present invention, cobalt solids, for instance, the catalyst metal cake from the decobalting system, is ground, if necessary, to a fine state of subdivision, preferably to a particle size less than five microns, in a suitable liquid medium, such as olefin feed or bottoms product from the distillation of the final alcohol product. The ground material may be passed to a mixing zone, wherein water is added in amounts adapted to give a stable emulsion. The addition of an emulsifier is particularly useful. The ratio of organic liquid to water may be varied from 10/1 to 1/10, while the amount of cobalt in such an emulsion may be in the range of 1 to 10%.

Prior to the present invention, it has been proposed to employ as catalyst, a slurry consisting of cobalt metal prepared on an inert carrier suspended in a liquid organic stream. Such slurries, however, are unstable and have erosive effects upon equipment, in particular, circulating pumps. In the process of the present invention, such erosion is avoided.

In pumping slurries of high density solids, it is difficult to keep a uniform solids concentration, and therefore, to control the catalyst input as desired. By forming a stable emulsion, uniform injection of the metal or compound can be controlled at will. In the prior art where an inert carrier was used, the relatively low density carrier solids helped to make slurry formation feasible. However, the carrier had to be kept suspended throughout the entire synthesis system to prevent plugging of equipment, and had to be removed and reimpregnated with cobalt metal for return to the system. In the process of the present invention, the presence of inert solids in the process stream is avoided.

It has in the past been suggested to add water to the carbonylation or aldehyde synthesis reactor. Such water not only appears to aid in selectivity to desired products, but also tends to decrease the formation of secondary reaction products by mass action considerations. However, such water, in the past, has been injected into the zone per se, thus forming two immiscible layers or zones therein, and thus, the maximum effectiveness of the water addition was not realized. In accordance with the present invention, wherein the water, together with the catalyst, is injected as a stable emulsion, this defect is remedied, and further benefits realized.

The present invention and its application will best be understood from the more detailed description hereinafter, wherein reference will be made to the accompanying drawing, which is a schematic representation of a system suitable for carrying out one embodiment of the invention. In this embodiment, the solid catalyst material is obtained from the decomposition of cobalt carbonyl to cobalt metal in the catalyst removal zone, as subsequently described. It is to be understood that the solid cobalt material may be oxide, carbonate, hydroxide, metal, etc. from any source. Referring now to the diagram, an olefinic hydrocarbon having one carbon atom less than the number of carbon atoms in the desired resulting oxygenated compound is fed through preheater 3 and line 4 to the bottom portion of primary reactor 2. The latter comprises a reaction vessel which may, if desired, be packed with non-catalytic material such as Raschig rings, porcelain chips, pumice, and the like. Reactor 2 may be divided into discrete packed zones, or it may comprise but a single reaction zone.

When starting up operations, the olefinic feed may, if desired, contain dissolved therein, 1–3% by weight of cobalt oleate based on olefin. Other soluble compounds of cobalt may also be used or a concentrated catalyst solution may be fed as a separate stream. However, as the run proceeds, the dissolved cobalt is gradually cut back and the catalyst is injected in accordance with the process of the present invention.

Solid cobalt metal, or oxide, or carbonate, dispersed in an aqueous emulsion of olefin feed, or alcohol distillation bottoms prepared in a manner described more fully below, is continuously injected into reactor 2 through injector line 5, proceeding from injector 7. The emulsion, which consists of about 5% by weight of finely ground cobalt, may be injected at the rate of 0.5 to 1.5 pounds per barrel of feed olefin, preferably at pressures equal to or slightly higer than those prevailing in reactor 2. A system suitable for the emulsion injection may comprise a pair of blowcases or feed cylinders, each of which is filled periodically with emulsion while the other is being discharged to the reactor by suitable gas pressure.

Simultaneously, a gas mixture comprising $H_2$ and CO in the approximate ratio of 0.5 to 2 volumes of $H_2$ per volume of CO is supplied through line 6 to primary reactor 2 and flows concurrently through reactor 2 with liquid olefin feed and dispersed catalyst. Reactor 2 is preferably operated at a pressure of about 2500–3500 p. s. i. g. and at a temperature of about 250°–450° F., depending upon the olefin feed and other reaction conditions. As a result of the reaction between cobalt and synthesis gases, cobalt carbonyls are formed, and it is commonly believed to be the hydrocarbonyl which catalyzes the conversion of olefins to aldehydes. The rates of flow of olefin, catalyst and synthesis gases through reactor 2 are so regulated and the temperatures so maintained that the desired conversion level of the olefin is obtained.

Liquid oxygenated reaction products containing cobalt carbonyl catalyst in solution, and unreacted synthesis gases are withdrawn overhead from an upper portion of high pressure reactor 2 and are transferred through line 8 to cooler 10 in which any conventional means of cooling are employed, and from thence via line 12 to high pressure separator 14 where unreacted gases are withdrawn overhead through line 16, scrubbed in scrubber 18 of entrained liquid and cobalt carbonyl and used in any way desired. They may be recycled to synthesis gas feed line 6 via line 20 and booster compressor 19, or purged through line 22.

A stream of primary reaction product containing dissolved therein, relatively high concentration of cobalt carbonyl is withdrawn from separator 14 through line 24. A portion of said withdrawn stream may be recycled, if desired, to reactor 2 via line 26 and injected at suitable points in the reaction zone to aid in the cooling and maintenance of temperature control of the primary carbonylation stage. The balance of the primary reaction product may be withdrawn through pressure release valve 27 and through line 28 and passed to catalyst removal or decobalting zone 30, wherein dissolved catalyst is decomposed to the metal, for example, by suitable heat treatment at about 300°–400° F. A stream of hydrogen-comprising gas may be admitted to zone 30 through line 32 to aid in stripping and removing the evolved carbon monoxide resulting from the decomposition of the metal carbonyl. Zone 30 may be operated at high pressures, though low pressures in the range of 15–200 p. s. i. g. may also be employed. If desired, it may be advantageous to operate with two or more decobalters, switching the stream from one to the other as the vessel in service accumulates excessive cobalt metal. The gas stream comprising $H_2$ and CO may be removed from zone 30 through line 34 and used in any manner desired.

The liquid carbonylation reaction product now substantially free of dissolved cobalt is withdrawn from catalyst removal zone 30 through line 35 to a metal recovery zone 36 whose operation is detailed more fully below. The metal-free liquid product is then passed through line 38 to the lower portion of hydrogenator 40. Simultaneously, hydrogen is supplied to reactor 40 through line 42 in proportions sufficient to convert the organic carbonyl compounds in the oxygenated feed into the corresponding alcohols. Hydrogenator 40 may contain a mass of any conventional hydrogenation catalyst, such as nickel, copper chromite, cobalt, sulfactive catalysts of the type of oxides and sulfides of tungsten, nickel, molybdenum and the like, either as such or supported on a carrier. Depending upon the catalyst, reactor 40 may be operated at pressures from 2500–4500 p. s. i. g. and at temperatures of from about 300°–600° F. and an $H_2$ feed rate of from about 5000 to 20,000 normal cubic feet per barrel of feed.

The products of the hydrogenation reaction may be withdrawn overhead through line 44, then through cooler 46 into high pressure separator 48, where unreacted hydrogen may be withdrawn overhead through line 50 for further use in the system, if desired, or for purging through line 51. Liquid products are withdrawn from separator 48 through pressure release valve 49 and line 52 to a low pressure gas separator 53, and are then passed to hydrocarbon still 54, where dissolved gases and low boiling products, mostly hydrocarbons boiling below the alcohol product desired are distilled overhead. Thus, when a $C_7$ polymer olefin fraction is the feed to carbonylation reactor 2, generally the product boiling up to 340° F. is removed as a heads cut in hydrocarbon still 54. This material may be withdrawn overhead through line 56 and may be used as a gasoline blending agent or in any other desired manner. The bottoms from this primary distillation are withdrawn from still 54 and are sent through line 58 to alcohol still 60 where the product alcohols boiling in the desired range may be removed overhead through line 62 by distillation at atmospheric or reduced pressures, depending upon their molecular weight. The bottoms from this distillation may be further employed as a vehicle for the cobalt metal formed in decobalting zone 30.

The metal recovery zone 36 may consists of apparatus such as a settler or filter for eliminating finely divided metal particles from the liquid. Hold-up time may be provided before final metal removal to permit sufficient agglomeration to facilitate removal of the last trace of metal. It is usually desired to clarify the liquid to a content of total metal, dissolved and suspended, of not over 0.001% by weight. It is also desirable to accomplish this in apparatus which prevents deposition of the metal on the walls, or settling out at multiple points, in order to remove the metal conveniently either by continuous withdrawal or by periodic emptying or dumping from one of two alternate collecting vessels.

Cobalt metal removed as a cake or sludge from recovery zone 36 may be conveyed through line 66 to a suitable grinding apparatus as ball mill 68 for grinding to the desired size, if necessary. Also, any residual settled cobalt sludge formed in decobalter 30 may be withdrawn from the bottom of that vessel and passed through lines 37 and 66 to grinder 68. In one embodiment of the invention, alcohol distillation bottoms are withdrawn from still 60 through line 64 and a portion of these bottoms comprising principally esters, acetals, and polymeric material, are added to form a suitable vehicle for the cake to be ground.

The finely ground material is then passed to mixer 70 equipped with suitable means of agitation, such as a propeller, and also passed into mixer 70 is a stream of water through line 72 in quantities sufficient to form a stable emulsion of uniform composition, containing about 1 to 10% cobalt. Temperatures are preferably 50°–150° F. The mixture may be further stabilized, if desired, with an added emulsifying agent, such as alkyl aryl sulfonates or polyether alcohols. The resulting emulsion is mixed well, and passed to injector 7, whence it is injected into reactor 2 through line 5.

Not all the bottoms need thus be added, and some bottoms product may be removed through line 71. Also, it may be desirable under some conditions, as when the cake is formed of adequately small particles, to omit the grinding step.

The process of the invention admits of numerous modifications apparent to those skilled in the art. Thus, it may, under certain conditions, be desirable to use the emulsion as a catalyst augmentation agent and add simultaneously dissolved catalyst with the feed and injected as described. Also, instead of continuous operation, the catalyst emulsion may be prepared by a batch process. Thus, a batch mixing vessel and feed tank of about 500 gallons capacity have been found adequate to supply catalyst for a 100 B./D. plant for about a 24 hour supply of catalyst.

Furthermore, fresh catalyst supply, either for normal operation, for starting up, or make-up for cobalt losses, may be in the form of emulsion either from metallic cobalt, metal recovered from a previous operation, or cobalt in the form of compounds which do not introduce objectionable anions or impurities into the system. The amount of cobalt that can be held in suspension depends upon the particle size, degree of agitation and emulsion stability, the nature of the organic liquid used, and upon the ratio of organic liquid to water. Preferable ratios are 10/1 to 1/10 and, the proportion of Co suspended is based upon the amount required for the reaction, i. e. about 0.1 to 0.8% Co on the olefin feed.

Furthermore, when decobalting is achieved by means of adding steam or water instead of hydrogen to decobalter 30, the resulting cooled steam may have significant amounts of cobalt compounds in solution. Such cooled steam may be employed to furnish at least a portion of the water to form the emulsion, thereby furnishing added catalyst to the system.

Other modifications apparent to those skilled in the art are within the scope of the invention.

The invention may be further illustrated by the following example, which shows the desirable effects produced when, as in accordance with the present invention, the solid cobalt is maintained suspended in an aqueous emulsion rather than present as a slurry.

*Technique*

Reactions were carried out with 350 grams (3.6 mols) of a $C_7$ fraction of polypropylene and catalyst concentrations were equivalent to 0.3 weight per cent cobalt. The mixture was placed in a 3-liter stainless steel shaker autoclave, pressure tested with cold synthesis gas (1/1 $H_2$/CO), depressured to about 200 pounds, and the system heated to 350° F. Pressure was then increased to about 2700–2900 p. s. i. and the system blocked from the pressure source. Reaction is allowed to proceed and pressure drop recorded as a function of time. Any induction period is noted. The time in minutes, required for the pressure to drop from the initial value (2800 p. s. i.) to 2000 p. s. i. is used as a measure of the reaction rate (rate index). The reaction rates obtained with several hydrocarbon-insoluble catalyst systems present as slurries is compared with cobalt oxide present as an aqueous emulsion, as in accordance with the present invention.

| Catalyst | Water, Vol. Percent | Minutes Induction Period | Reaction Rate Index |
|---|---|---|---|
| Cobalt Oxide | 0 | 5, 9 | 128, 137 |
| Cobalt Metal | 0 | 5, 5 | 182, 192 |
| Cobalt Carbonate | 0 | 5 | 162 |
| Cobalt Basis Formate | 0 | 5 | 174 |
| Cobalt Oxide (Emulsion)* | 2 | 15 | 63 |
| Cobalt Oxide (No Emulsion) | 2 | 120 | 127 |

* 1.42% emulsifier added.

The above data clearly show the slow reaction rates of ordinary insoluble slurry catalysts and the large increase in reaction rates realized when the catalyst is introduced into the reaction zone as a dispersion in an aqueous emulsion.

What is claimed is:

1. In a continuous carbonylation process wherein olefinic carbon compounds, CO and $H_2$ are contacted in a carbonylation zone at elevated temperatures and pressures with a cobalt carbonylation catalyst under conditions to produce aldehydes containing one more carbon atom than said olefinic carbon compound, the improvement which comprises injecting into said zone an aqueous emulsion of an olefinic water insoluble liquid having dispersed therein, finely divided cobalt-comprising solid.

2. The process of claim 1 wherein said solid is cobalt metal.

3. The process of claim 1 wherein said solid is an oxide of cobalt.

4. The process of claim 1 wherein said solid is a cobalt salt.

5. The process of claim 1 wherein said liquid is a hydrocarbon.

6. The process of claim 1 wherein said liquid is the bottoms product from the distillation of alcohols formed in the subsequent hydrogenation of said aldehydes.

7. The process of claim 1 wherein the ratio of water to said liquid in said emulsion is in the range of 1/10 to 10/1.

8. In a continuous carbonylation process wherein olefinic carbon compounds, CO, and $H_2$ are contacted in a carbonylation zone at elevated temperatures and pressures with a cobalt carbonylation catalyst under conditions to produce aldehydes having one more carbon atom than said olefinic carbon compounds, and wherein a liquid reaction product comprising aldehydes and dissolved cobalt carbonyl is passed to a catalyst decomposition zone wherein cobalt carbonyl is decomposed to form a cobalt-containing sediment, the improvement which comprises removing said sediment from said catalyst decomposition zone, dispersing at least a portion thereof in an aqueous emulsion of an organic liquid, and injecting said emulsion into said carbonylation zone.

9. The process of claim 8 wherein said sediment is ground prior to formation into an emulsion.

10. The process of claim 9 wherein said sediment after grinding, is dispersed in an aqueous emulsion of the bottoms product from the distillation of alcohols formed in the subsequent hydrogenation of said aldehydes.

11. In a continuous carbonylation process wherein olefinic carbon compounds, CO and $H_2$ are contacted in a carbonylation zone at elevated temperatures and pressures with a cobalt carbonylation catalyst under conditions to produce aldehydes having one more carbon atom than said olefinic carbon compounds and wherein a liquid reaction product comprising aldehydes and dissolved cobalt carbonyl is passed to a catalyst decomposition zone wherein cobalt carbonyl is decomposed by the action of water to form a cobalt comprising sediment and an aqueous solution containing dissolved therein substantial quantities of cobalt, the improvement which comprises removing said sediment and said solution from said catalyst decomposition zone, forming an emulsion of said sediment with an organic liquid and with at least a portion of said cobalt comprising aqueous solution and injecting said emulsion into said carbonylation zone.

References Cited in the file of this patent

UNITED STATES PATENTS

| | | |
|---|---|---|
| 2,433,072 | Stewart et al. | Dec. 23, 1947 |
| 2,440,109 | Moore | Apr. 20, 1948 |
| 2,514,961 | Max | July 11, 1950 |

OTHER REFERENCES

I. G. Farben—Pat. Appl. I 71 966 IV d/120 April 2, 1942. Translated by Chas. A. Meyer & Co., New York, in book entitled "Oxo Process," Chapter 14, pp. 35–37.

Storch et al.: "The Fischer-Tropsch and Related Synthesis," p. 441 (1951), John Wiley & Sons, N. Y.